United States Patent [19]

Bowman

[11] Patent Number: 4,601,023

[45] Date of Patent: Jul. 15, 1986

[54] AUTOMATIC GAIN CONTROL IN SEISMIC DATA SAMPLES

[75] Inventor: Bonita F. Bowman, Arlington, Tex.

[73] Assignee: Mobil Oil Corporation, New York, N.Y.

[21] Appl. No.: 569,829

[22] Filed: Jan. 11, 1984

[51] Int. Cl.⁴ .............................................. G01V 1/36
[52] U.S. Cl. ........................................ 367/65; 367/47
[58] Field of Search ................. 367/38, 65, 66, 67, 367/47

[56] References Cited
U.S. PATENT DOCUMENTS 3,185,930 5/1965 Crawford et al. .................... 367/65
3,496,531 2/1970 Sullivan et al. ...................... 367/65

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

A method for applying automatic gain control to seismic signals is disclosed which features least means squares fitting the average absolute value of the data in windows of a seismic trace to an exponential function, wherein values for the parameters defining the function are derived and applying a gain function using these parameters to the data.

3 Claims, 3 Drawing Figures

AUTOMATIC GAIN CONTROL IN SEISMIC DATA SAMPLES

FIELD OF THE INVENTION

This invention relates to seismic data processing. More particularly, the invention relates to an improvement in automatic gain control for seismic data in which compensation is made for spherical divergence of the acoustic energy in the earth and other signal losses.

BACKGROUND OF THE INVENTION

It is now commonplace to explore for oil, gas and other valuable minerals by seismic exploration, in which seismic energy is imparted to the earth. The seismic energy passes through the earth, and is reflected at interfaces between rock layers of varying acoustic impedance. Its return to the surface of the earth can be detected by acoustic microphones referred to as geophones when used in land-based exploration, or as hydrophones when exploring the seabed. For the purposes of this invention, geophones and hydrophones are equivalent. The geophone output when plotted as a function of time is referred to as a trace. If the traces from a plurality of such geophones are plotted next to one another the wavelets caused by reflection of the seismic energy from a single subterranean layer line up, and a picture approximating the subterranean structure of the earth emerges which can be used by geophysicists in the search for oil, gas and other minerals.

It is well known that as the geophones become displaced further and further from the source of seismic energy, the relative amplitude of the received signal drops off due to divergence of the generally spherical wave front within the earth as it travels therethrough. It is known to apply automatic gain control to the fainter portions of a given trace so that the average amplitude of the trace is more close to constant, so as to enable more efficient analysis. However, insofar as the present inventor is aware, no method is available for calculating the amount of gain to be applied which is completely appropriate. In particular, no method is known which directly compensates for losses due to spherical divergence as well as for other signal losses due to reflectivity and the like.

OBJECTS OF THE INVENTION

It is accordingly an object of the invention to provide an improved method of applying automatic gain control to seismic traces whereby various events occurring in the seismic record can be more directly compared to one another.

It is a further object of the invention to provide a method for applying automatic gain control to seismic information which appropriately compensates for spherical divergence as well as reflectivity functions, but which is relatively accurate and reasonably straightforward to implement.

SUMMARY OF THE INVENTION

The needs of the art and objects of the invention mentioned above are satisfied by the present invention according to which automatic gain control is applied in accordance with a function which effectively compensates for spherical divergence and other non-continuous losses. The trace is divided into "windows", and the average of the absolute values of all the samples of the signal within each window is computed. The logarithms of the absolute average values are then least means squares fit to the function $P \ln t + at + B$ where $P$, $a$ and $B$ are constant and $t$ is time. Each sample is then divided by a gain function equal to $t^P \exp(at + B)$.

BRIEF DESCRIPTION OF THE DRAWINGS

The invention will be better understood if reference is made to the accompanying drawings, in which.

DESCRIPTION OF THE PREFERRED EMBODIMENTS

Figure 1:
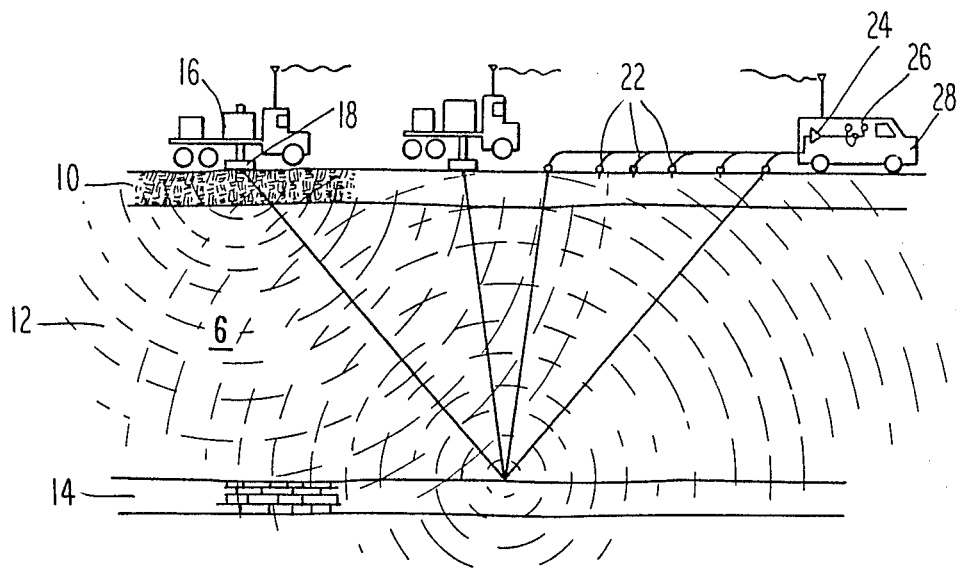
FIG. 1 shows generally the schematic outline of a seismic exploration operation.

FIG. 1 shows a typical seismic exploration operation. Seismic energy is imparted to the earth as indicated generally by spherical wave fronts shown at 6. As is well understood, the energy can be output by any desired means, for example, a truck 16 which is raised upon a platen 18 and vibrated to impart seismic energy to the earth. The energy travels downwardly into the earth through varying rock layers 10 and 12 and is reflected from a rock layer of differing impedance such as at 14, and returns back upwardly to be detected by geophones 22 connected to amplifiers 24 and recording equipment 26 carried in a second truck 28.

As shown schematically on the drawing of FIG. 1, the waves radiate outwardly in a generally spherical shape. Clearly the amplitude of the wave thus is attenuated very quickly as the wave travels through the earth. Furthermore, geophones spaced at longer distances from the source 16 receive a substantially weaker signal than those which are closer. In the prior art, compensation for this attenuation has been made to the recorded seismic signals. Filtering has been proposed, as well as correction simply based on source-to-receiver distance. However, it is believed that a more accurate and more meaningful automatic gain control can be provided if an exponential function is least squares fit to the average of the absolute value of the amplitude of portions of the recorded data and if the recorded data is then corrected according to this function.

Figure 2:
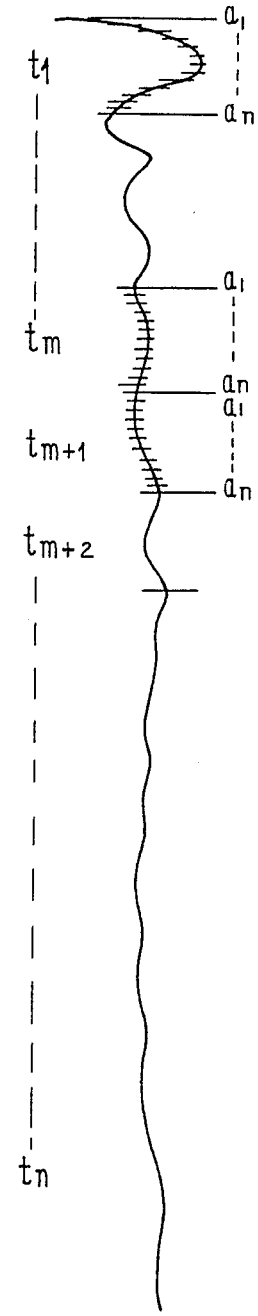
FIG. 2 shows schematically a typical seismic trace exhibiting the need for automatic gain control.

In the preferred embodiment of the invention, an individual seismic trace is subdivided into "windows" for this analysis. This is shown schematically in FIG. 2, in which a single seismic trace 30 is shown being divided into a number of windows in time $t_1$ through $t_n$. Within each of the windows $t_i$ a number of samples $a_1$ through $a_n$ are taken of the signal. In the usual seismic data processing scheme, these will simply be digital samples of the analog signal.

Figure 3:
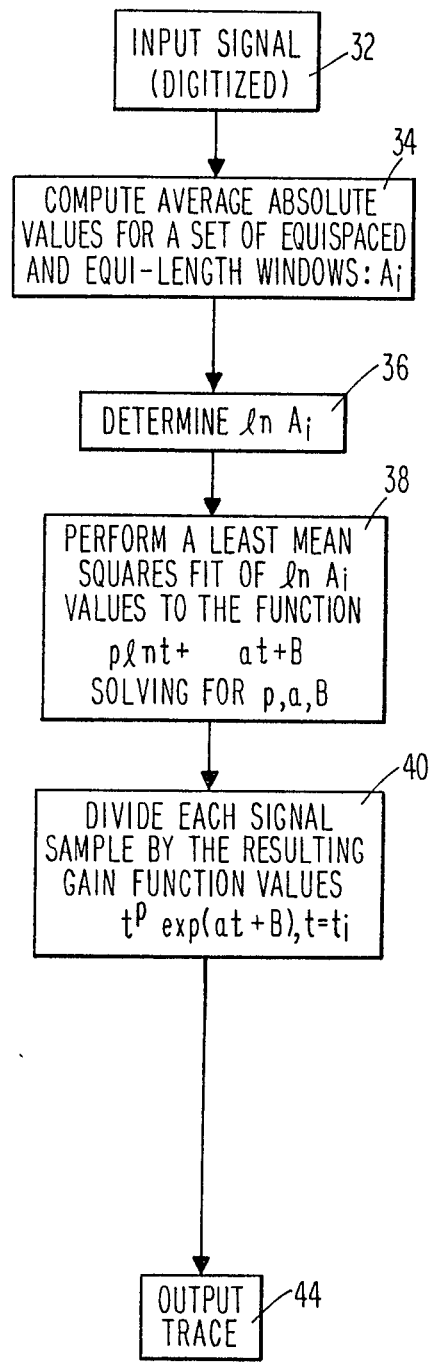
FIG. 3 shows a flowchart of the method of the invention.

FIG. 3 shows a flowchart of the method of the invention. At 32, the digitized input values $a_i$ for a given window are input. At 34, the average of the absolute values of the samples $a_i$ in each interval $t_i$ is computed, yielding a single value $A_i$ for each window. At 36 the logarithm of each of these $A_i$ values is calculated. At 38, these values of the logarithm of $A_i$ are least means squares fit to the function $p \ln t + at + B$, which results in values for the parameters $p$, $a$ and $B$. This function is equivalent to $\ln t + (p-1) \ln t + at + B$. In this expression the logarithmic term $\ln t$ compensates for spherical divergence when $p = 1$ while the term $(p-1) \ln t + at + B$ corrects for losses due to reflection of the wave and other noncontinous losses. Thus, this function, as determined by the least means squares fit, represents a mathematical expression of the log of expected amplitude variations. Each of the individual sample values $a_i$ within each window $t_i$ is then divided at 40 by the gain function $t^P \exp(at+B)$, thus correcting the entire trace which can then be output at 44 for further processing as desired. It is noted that the function of $t^P\exp(at+B)$ is the least means square function raised to the e power and thus is a mathematical expression of expected amplitude variation of $A_i$. Dividing each value of $A_i$ by this function for corresponding values of t provides a correction to minimize the expected amplitude errors.

While a preferred embodiment of the invention has been shown and described, it should be appreciated that the invention is not limited by the above exemplary disclosure, but only by the following claims.

I claim:

1. In a method of seismic exploration in which the amplitude of signals output by a geophone in a response to detection of a seismic wave within the earth is sampled at intervals to obtain a series of samples, the improvement which comprises applying automatic gain control compensation to said sample amplitude values, said compensation being applied according to the following steps:
   selecting a plurality of respective windows of said series;
   determining the average absolute value of the amplitude of the samples within each of said windows;
   determining the logarithms of said average absolute values,
   least means squares fitting the logarithms of said average absolute values to a logarithmic function, according to which values for parameters defining said logarithmic function are determined; and
   applying a gain function to each of said sample values, said gain function corresponding to said logarithmic function.

2. The method of claim 1 wherein said function to which said logarithmic values are least means squares fitted is $p \ln t + at + B$, and wherein said least means squares fitting comprises determining the parameters p, a and B.

3. The method of claim 2, wherein said gain function is $t^P\exp(at+B)$.

* * * * *